March 24, 1931.  T. B. ALLARDICE  1,797,749
WATER HEATER
Filed Dec. 31, 1927  2 Sheets-Sheet 2

INVENTOR
Thomas B. Allardice
BY
ATTORNEYS

Patented Mar. 24, 1931

1,797,749

UNITED STATES PATENT OFFICE

THOMAS R. ALLARDICE, OF MOUNTAIN LAKES, NEW JERSEY

WATER HEATER

Application filed December 31, 1927. Serial No. 243,870.

My present invention relates to an apparatus for heating water for hot water supplies in households, apartments, and other places. It furthermore relates to that type of heater in which the water supply to a hot water boiler is carried through a receptacle in which there is a coil for circulating hot water from a steam or other boiler. The object of the invention is the provision of a heater of this type which may be operated from the steam boiler or similar device when the same is in use and may be operated from another source of heat supply preferably electrically when the steam boiler is not in use. Furthermore, the apparatus made in accordance with my invention is preferably so constructed as to create a good circulation of the water in the receptacle whereby the hotter water is more or less concentrated at the top of the receptacle from which, as will be understood, the circulation of the water causes the same to flow to the hot water tank or the hot water supply system. With this and other objects in view the heater made in accordance with this invention preferably comprises a receptacle of frusto conical configuration enclosed in a suitable casing and containing a coil to be connected to a steam boiler or other similar apparatus and also provided with electrical heating devices and the necessary connections for the water supply to and from the receptacle as will be hereinafter more particularly described.

Figure 1:
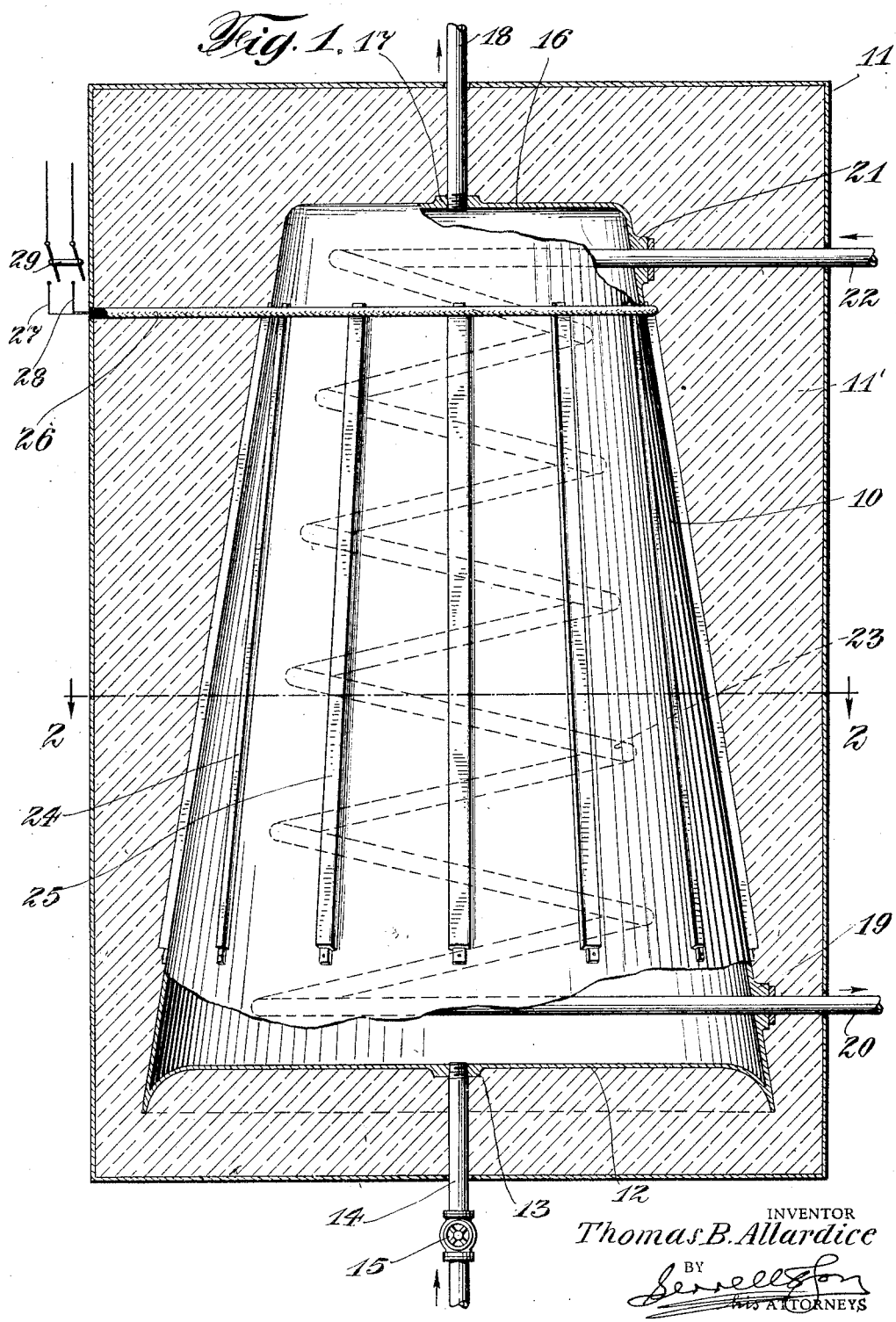
Figure 2:
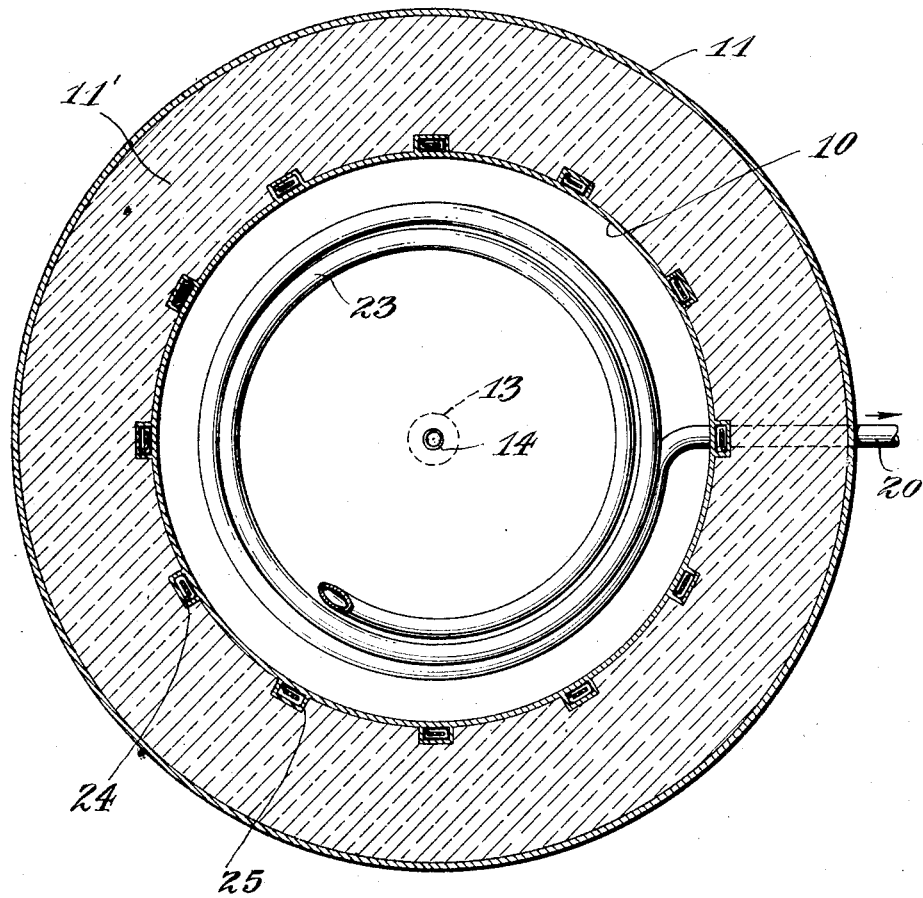

In the drawing Figure 1 is a central vertical section and partial elevation illustrating a water heater made in accordance with this invention, and Figure 2 is a section on line 2—2, Figure 1.

In carrying out the invention I employ a receptacle 10 made of suitable metal and in a frusto conical form, the larger end of the receptacle being at the bottom. The receptacle 10 is preferably enclosed in a suitable casing 11 preferably made of sheet metal and filled with any good heat insulating material as indicated at 11'. In the bottom 12 of the receptacle there is a tapped boss 13 for connection with a supply pipe 14 in which there may be a valve 15. In the top 16 of the receptacle there is also a tapped boss 17 for making connection with an outlet pipe 18. The bosses 13 and 17 are preferably placed in central positions in the bottom and top of the receptacle, but, of course, may be placed in any other positions if necessary or desirable. In a suitable position adjacent the bottom of the receptacle the side wall is provided with a boss 19 through which a pipe 20 passes. Also in the side wall of the receptacle adjacent the top there is a boss 21 through which a pipe 22 passes. Interiorly of the receptacle there is a coil 23. The upper end of the coil is connected to, or is a continuation of, the pipe 22, whereas the lower end of the coil is a continuation of, or is connected to, the pipe 20. As illustrated, the lower convolutions of the coil 23 are of a greater diameter than the upper convolutions thereof, and the convolutions of the coil are gradually reduced in diameter so as to conform substantially with the conical side walls of the receptacle.

The pipe 14 may be connected to the water supply and the pipe 18 to the service distribution pipe or the hot water system, or, as will be understood, the pipe 14 may be connected to the lower end of the hot water boiler and the outlet pipe 18 to the upper end thereof whereby the contents of the hot water boiler is heated from the heater apparatus. It will also be understood that the pipe 20 is connected to the water chamber of the steam boiler or similar apparatus, whereas the pipe 22 is connected to the upper portion of the water chamber of a steam boiler. By this construction, as will be understood, in the steam boiler there will be a circulation of hot water through the coil 23 in the heater apparatus to heat the water in the receptacle and that due to the conical construction of the receptacle there will be a pre-circulation of the water therein, whereby the water at the top of the receptacle will tend to be of higher temperature than that at the bottom thereof.

The apparatus also includes a series or a plurality of electrical resistances indicated at 24 and 25. These resistances may be heated bars or coils or other similar devices and are preferably so placed as to contact with the outer conical surface of the receptacle and so as to extend longitudinally thereof. As illustrated, a heater conduit 26 may be employed to carry the necessary leads 27 and 28 to these heater elements, and a switch 29 may be utilized for completing a circuit from a suitable source of supply through the leads to the heater elements. Of course, it will be understood that the electrical heater elements are utilized only when the steam boiler or similar device is not in use or when there is an insufficient hot water supply to the coil. Although it forms no part of the invention, it will be obvious that by suitable thermostatic apparatus the switch lead 29 may be operated to open and close the circuit at such times as to automatically maintain an ample supply of hot water in the use of the apparatus herein described.

It will now be understood and appreciated that due to the conical form of the receptacle and the heater elements being arranged on the outer surface longitudinally thereof, these heater elements will be closer together at their upper ends than at their lower ends whereby there is a concentrated heat effect at the upper end of the receptacle; and furthermore that the water upon being heated rises and is brought rapidly into contact with the heated sloping walls of the receptacle whereby the circulation of the water is increased and the water heated more quickly than is possible with the use of a cylindrical vessel. Obviously also the water coil may be eliminated and the heater arranged to be operated at all times by the heater elements whether these be electrical or otherwise.

I claim as my invention:

1. In a water heater, a frusto conical receptacle, a casing, insulating material immediately surrounding the said receptacle and filling said casing, a coil within the receptacle extending longitudinally thereof with the diameter of the lower convolutions of the coil being larger than the diameter of the upper convolutions thereof, connections for circulating hot water through the said coil, a plurality of spaced electrical heater units exteriorly of the wall of the receptacle and extending longitudinally thereof between the same and the insulating filling, and connections for a water supply to and from the said receptacle.

2. In a water heater, a frusto conical receptacle, a casing, insulating material immediately surrounding the said receptacle and filling said casing, a coil within the receptacle extending longitudinally thereof with the diameter of the lower convolutions of the coil being larger than the diameter of the upper convolutions thereof, connections for circulating hot water through the said coil, a plurality of spaced electrical heater units exteriorly of the wall of the receptacle and extending longitudinally thereof between the same and the insulation casing, means for opening and closing a circuit to the said heater elements, and connections for a water supply to and from the said receptacle.

3. In a water heater, a frusto conical receptacle, a casing, insulating material immediately surrounding the said receptacle and filling said casing, a plurality of spaced electrical heaters exteriorly of the wall of the receptacle and extending longitudinally thereof between the same and the insulation casing, means for opening and closing a circuit to the said heater elements, and connections for a water supply to and from the said receptacle.

4. In a water heater, a frusto-conical receptacle for storing and heating water, a coil within the receptacle extending longitudinally thereof with the diameter of the convolutions of the coil larger at one end than at the other end thereof, connections to and from the coil for circulating hot water therethrough, connections for a water supply to and from the said receptacle, and electrical heater units associated with the walls of the receptacle.

Signed by me this 16th day of December, 1927.

THOMAS B. ALLARDICE.